United States Patent

Courts

[11] Patent Number: 5,306,207
[45] Date of Patent: Apr. 26, 1994

[54] AIR REMOVAL APPARATUS

[76] Inventor: James K. Courts, 8715 Newfield La., Beaumont, Tex. 77707

[21] Appl. No.: 17,177

[22] Filed: Feb. 12, 1993

[51] Int. Cl.⁵ .......................... F24F 7/06; F16L 3/00
[52] U.S. Cl. .................................. 454/49; 454/354; 454/191; 411/401
[58] Field of Search ............. 454/49, 339, 341, 345, 454/354, 191, 189, 903; 411/338, 366, 401

[56] References Cited

U.S. PATENT DOCUMENTS

| | | | |
|---|---|---|---|
| 1,214,829 | 2/1917 | Ross | 411/366 |
| 1,552,316 | 9/1925 | Krieg | 454/49 |
| 1,630,317 | 5/1927 | Skonier | 454/49 |
| 1,925,689 | 9/1933 | Dietrich | 411/366 |
| 3,516,232 | 6/1970 | Gilbertson | 454/49 |
| 3,807,148 | 4/1974 | Fike et al. | 55/385 |
| 4,071,338 | 1/1978 | Hutter, III et al. | 55/385 C |
| 5,111,739 | 5/1992 | Hall | 454/306 |
| 5,149,040 | 9/1992 | Heath | 248/300 |

Primary Examiner—Henry A. Bennet
Assistant Examiner—William C. Doerrler
Attorney, Agent, or Firm—S. Michael Bender

[57] ABSTRACT

A new and improved wide area air removal apparatus includes at least one air duct that traverses a portion of the wide area and includes a plurality of apertures arrayed along the length of the air duct. An electric fan assembly is connected to the plural-aperture-including air duct for creating a vacuum in the plural-aperture-including air duct and for moving air from the wide area through the apertures and through the air duct to outside the air duct. The air that is removed from the wide area can be filtered and returned to the wide area; or it can be moved outside the wide area. The air that is removed from the wide area can be laden with smoke or other odor-bearing substances. The wide area can be a room in a building. The plural-aperture-including air duct may include a plurality of air duct branches. In addition, ash tray collars may be provided for placement circumferentially around ash trays. The ash tray collars include apertures for drawing in air adjacent to the ash trays. Feeder lines are connected at a first end to the ash tray collars and at a second end to the plural-aperture-including air duct. Adjustable hanger assemblies may be provided for connecting the plural-aperture-including air duct to a ceiling.

9 Claims, 4 Drawing Sheets

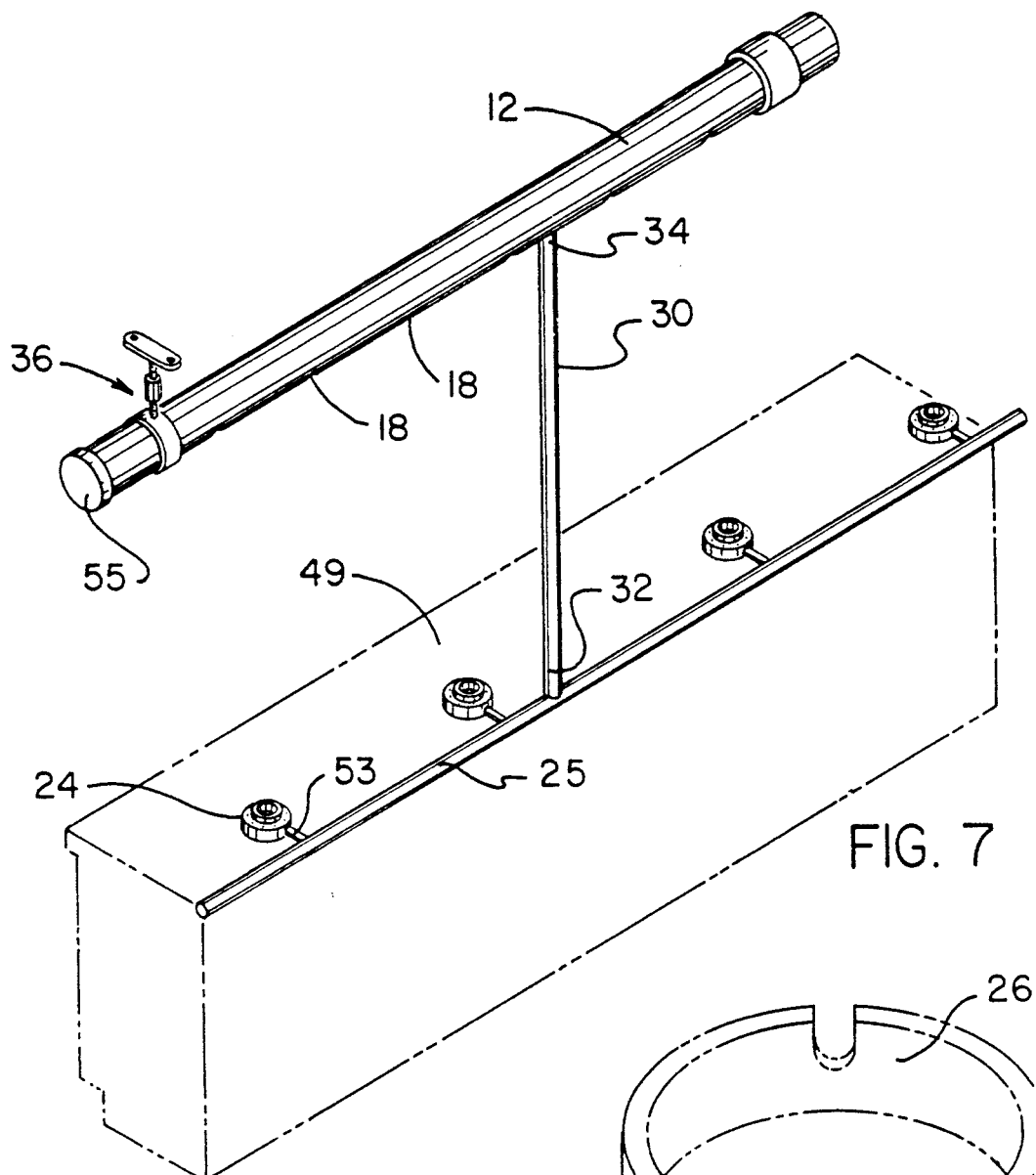
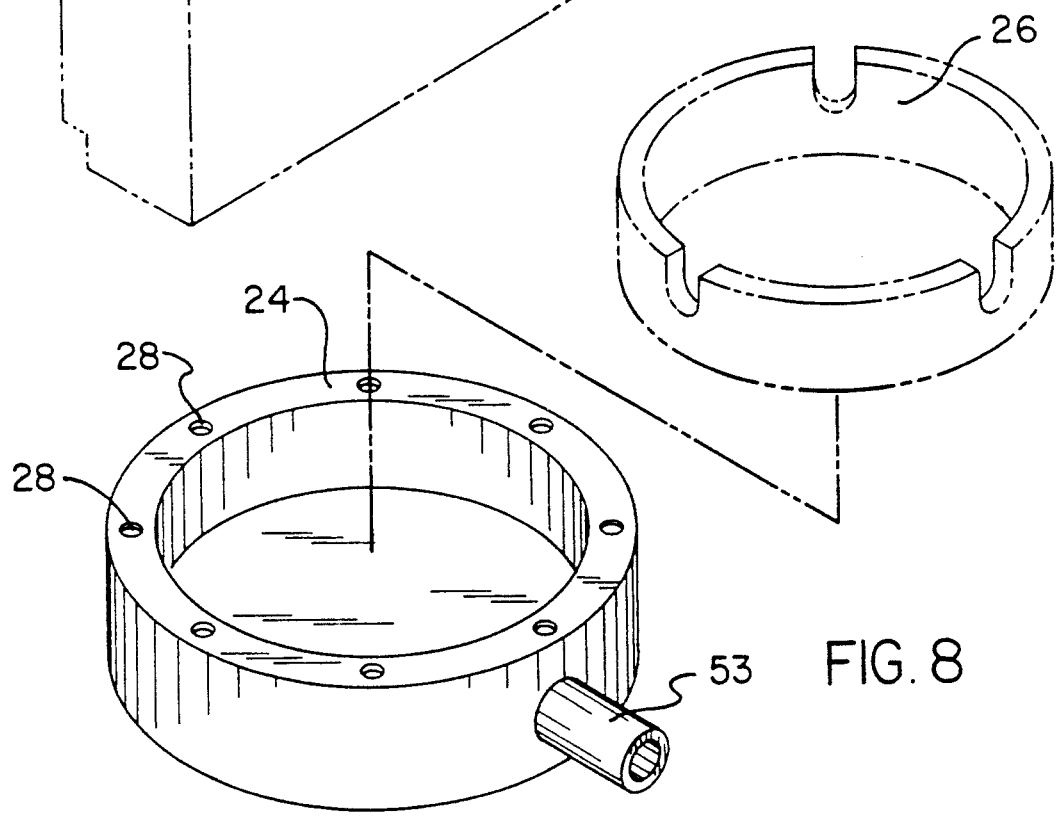

AIR REMOVAL APPARATUS

BACKGROUND OF THE INVENTION

1. Field of the Invention

The present invention relates generally to apparatus for removing unwanted air from a location, and more particularly, to an apparatus for pulling unwanted air out from a wide area, such as a room.

2. Description of the Prior Art

Ventilation apparatuses, which pull unwanted air away from locations are well known in the art. For example, the following U.S. patents disclose ventilation apparatuses: U.S. Pat. Nos. 3,726,202 of Ahlberg; 4,732,591 of Tujisawa et al; 4,903,894 of Pellinen et al; 4,975,251 of Saceman; and 5,031,515 of Niemela et al. The prior art devices disclosed in the above-mentioned patents share a common characteristic which is that air is removed by a conduit that has two open ends and a closed tubular body therebetween. In this respect, air is drawn from one open end, an input end, passed through the closed tubular body, and passes out the other open end, an output end.

With such prior art devices, only the unwanted air present in the general vicinity of the open input end is drawn into the closed tubular conduit. In order for other unwanted air to be removed from a wide area, such as a room, to be removed from the wide area, the unwanted air must circulate to the open input end of the prior art devices. In this respect, it would be desirable if an apparatus were provided which removed unwanted air from a wide area without the need for the unwanted air to circulate to a single open input end of a ventilation system.

One form of unwanted air that is common in restaurants, lounges, nightclubs, bars, and the like is smoke-laden air. Because of the risks of cigarette smoke to both smokers and nonsmokers alike, it would be desirable if ventilation systems in such establishments provided adequate smoke removal. Yet, many such establishments do not have adequate ventilation systems to purge rooms of unwanted smoke. Moreover, it would be very costly if such establishments had to replace their ventilation systems with newer systems that had greater smoke removal capacities. In this respect, it would be desire if public establishments could be easily and inexpensively retrofitted to provide adequate smoke removal.

Ventilation systems that are already in place in an establishment include hidden duct work installed in walls and ceilings. To replace or modify such hidden duct work would require much time and labor. In this respect, it would be desirable to retrofit an establishment to remove unwanted smoke-laden air without the need to replace or modify hidden duct work that is associated with the in-place ventilation system.

Installation of duct work that is in-place in an establishment often requires the fabrication of customized ducts, bends, and couplings. Making and installing such customized components require much time and labor and contribute to the relative high costs of making and installing a ventilation system. In this respect, for retrofitting an establishment to provide a ventilation system to remove unwanted, smoke-laden or other odor-bearing air, it would be desirable if the retrofitted system employed relatively low cost off-the-shelf ducts, couplings, and bends.

Smoke, by its very nature, being associated with heated air, rises in a room. Thus, a retrofitted smoke-removal apparatus can be installed near a ceiling of a room. Installation of a retrofitted smoke removal apparatus near a ceiling would suggest that the retrofitted system be suspended from the ceiling. However, if components of a retrofitted smoke removal apparatus are to be suspended from a ceiling, they should be light weight.

Air in a room may have been treated in some way before it entered the room. For example, the air may have been heated, cooled, humidified, or dehumidified depending upon temperature and humidity outdoors. In this respect, it would be desirable to be able to remove smoke and other odor-bearing substances from the room air and return smoke-free air to the room.

The smoke that enters a room enters from cigarettes that are held by a smoker and from cigarettes that are placed in ash trays. In this respect, it would be desirable if a smoke-removal apparatus included devices adapted to remove smoke directly from ash trays.

Thus, while the foregoing body of prior art indicates it to be well known to use hidden, expensive ventilation systems to remove air from rooms, the provision of a more simple and cost effective device is not contemplated. Nor does the prior art described above teach or suggest removal of unwanted air from a wide area without the need for the unwanted air to circulate to a single open input end of a ventilation system. Also, the prior art does not provide for easy and inexpensive retrofitting of public establishments to provide for adequate removal of smoke and other odor-bearing substances. The prior art does not provide retrofitting of an establishment to remove unwanted smoke-laden air without the need to replace or modify hidden duct work that is associated with the in-place ventilation system. In addition, the prior art does not provide a retrofitting system that employs relatively low cost off-the-shelf ducts, couplings, and bends. Also, the prior art does not provide components of a retrofitted smoke removal apparatus that are to be suspended from a ceiling, and that are light weight.

The foregoing disadvantages are overcome by the unique wide area air removal apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved wide area air removal apparatus that includes at least one air duct that traverses a portion of the wide area; wherein the air duct has a length and at least one sidewall which includes a plurality of apertures arrayed along the length of the air duct. An electric fan assembly is connected to the plural-aperture-including air duct for creating a vacuum in the plural-aperture-including air duct and for moving air from the wide area through the apertures and through the air duct to outside the air duct. The air that is removed from the wide area can be filtered and returned to the wide area; or it can be moved outside the wide area. The wide area can be a room in a building. The plural-aperture-including air duct may include a plurality of air duct branches.

In addition, ash tray collars may be provided for placement circumferentially around ash trays. The ash tray collars include apertures for drawing in air adjacent to the ash trays. Feeder lines are connected at a first end to the ash tray collars and at a second end to the plural-aperture-including air duct.

Adjustable hanger assemblies may be provided for connecting the plural-aperture-including air duct to a ceiling. The adjustable hanger assemblies include a first element for connecting to the ceiling. The ceiling connecting element includes a horizontal plate element which includes a plurality of apertures and a first vertically projecting element which includes first threads. A sleeve element includes a first threaded portion and a second threaded portion; and the first threaded portion is complementary to the first threads on the first vertically projecting element. The hanger assemblies also include a duct connecting element which includes a hollow cylindrical element for encompassing a portion of the plural-aperture-including air duct and includes a second vertically projecting element which includes second threads. The second threads on the second vertically projecting element are complementary to the second threaded portion on the sleeve element.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved wide area air removal apparatus which has all of the advantages of the prior art and none of the disadvantages.

It is another object of the present invention to provide a new and improved wide area air removal apparatus which may be easily and efficiently manufactured and marketed.

It is a further object of the present invention to provide a new and improved wide area air removal apparatus which is of durable and reliable construction.

An even further object of the present invention is to provide a new and improved wide area air removal apparatus which is susceptible of a low cost of manufacture with regard to both materials and labor, and which accordingly is then susceptible of low prices of sale to the consuming public, thereby making such wide area air removal apparatus available to the buying public.

Still yet a further object of the present invention is to provide a new and improved wide area air removal apparatus which removes unwanted air from a wide area without the need for the unwanted air to circulate to a single open input end of a ventilation system.

Still another object of the present invention is to provide a new and improved wide area air removal apparatus that can be easily and inexpensively retrofitted to provide adequate smoke and other odor-bearing substance removal.

Yet another object of the present invention is to provide a new and improved wide area air removal apparatus that can be used to retrofit an establishment to remove unwanted smoke-laden or other odor-bearing air without the need to replace or modify hidden duct work that is associated with the inplace ventilation system.

Even another object of the present invention is to provide a new and improved wide area air removal apparatus that can be employed as a retrofitted system that uses relatively low cost off-the-shelf ducts, couplings, and bends.

Still a further object of the present invention is to provide a new and improved wide area air removal apparatus that is suspended from a ceiling and that employs light weight components.

Yet another object of the present invention is to provide a new and improved wide area air removal apparatus that is capable of removing smoke from the room air and returning smoke-free air to the room.

Still another object of the present invention is to provide a new and improved wide area air removal apparatus that includes devices adapted to remove smoke directly from ash trays.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 7 a perspective view of a second embodiment of the wide area air removal apparatus of the invention which includes a feeder line and a plurality of ash tray collars connected to a manifold which is connected to the feeder line.

FIG. 8 is an enlarged, exploded, perspective view of an ash tray about to be placed in an ash tray collar of the invention.

DESCRIPTION OF THE PREFERRED EMBODIMENT

With reference to the drawings, a new and improved wide area air removal apparatus embodying the principles and concepts of the present invention will be described.

Figure 1:
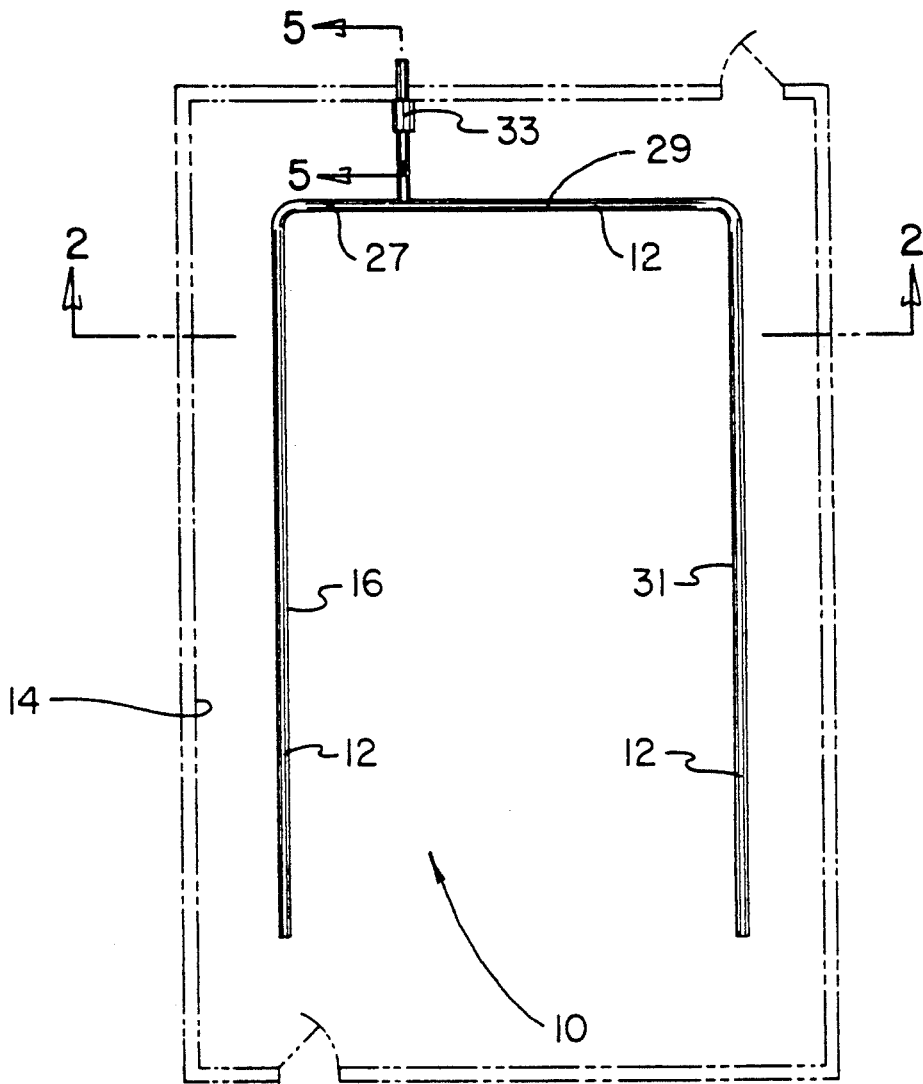
FIG. 1 is a top view showing a first preferred embodiment of the wide area air removal apparatus of the invention installed on a ceiling or a room, with the ceiling removed for purposes of viewing the invention.
Figure 2:
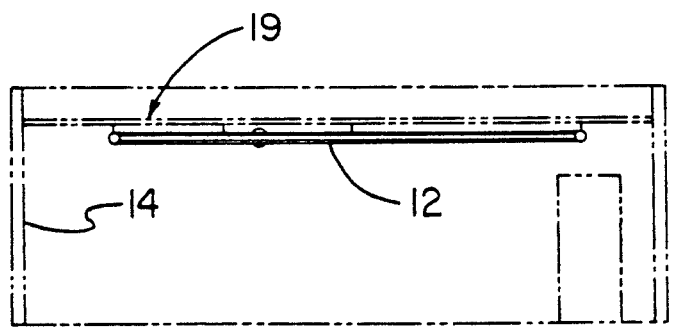
FIG. 2 is a cross-sectional view of the wide area air removal apparatus along line 2—2 of FIG. 1.

Turning initially to FIGS. 1-2, there is shown a first exemplary embodiment of the wide area air removal apparatus of the invention generally designated by reference numeral 10. In its preferred form, wide area air removal apparatus 10 includes at least one air duct 12 traversing a portion of the wide area 14, which is room 14. The air duct 12 has a first length 16, a second length 27, a third length 29, a fourth length 31, and a tubular sidewall 20 (see FIG. 4) which includes a plurality of apertures 18 arrayed along the respective lengths 16, 27, 29, and 31 of the air duct 12. Length 16 may be deemed to be one branch of the air duct 12; and length 31 may be deemed a second branch of the air duct 12.

Figure 5:
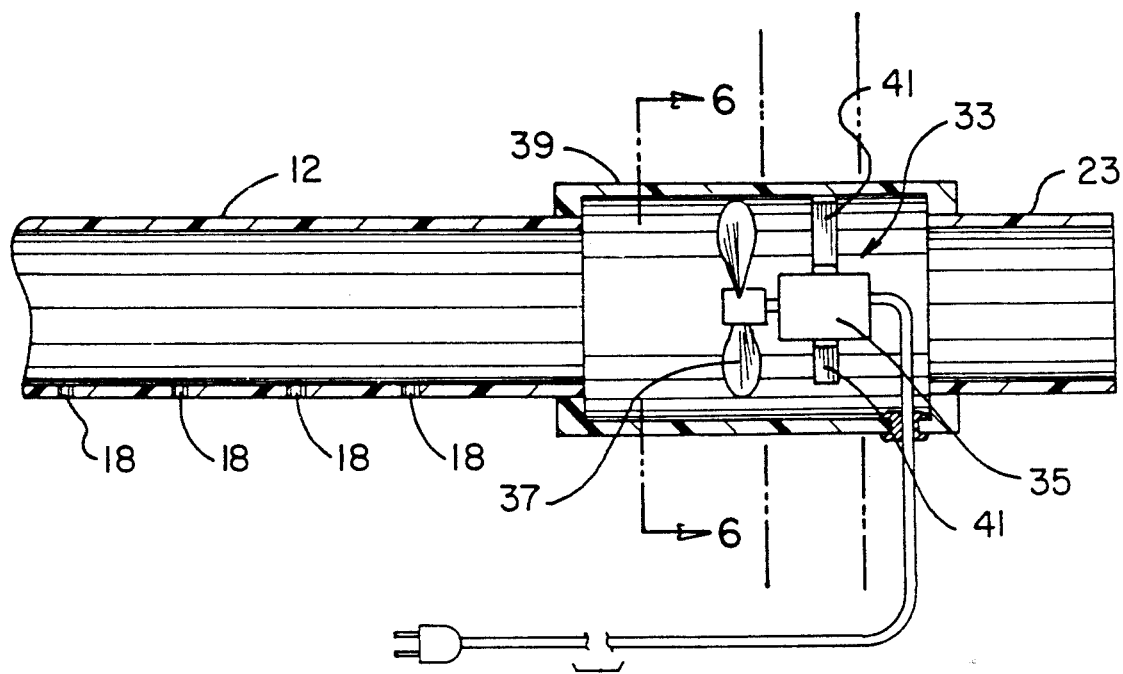
FIG. 5 is an enlarged, cross-sectional view of the embodiment of the wide area air removal apparatus of the invention shown in FIG. 1 taken along the line 5—5 thereof, showing a vacuum-creating electric fan.
Figure 6:
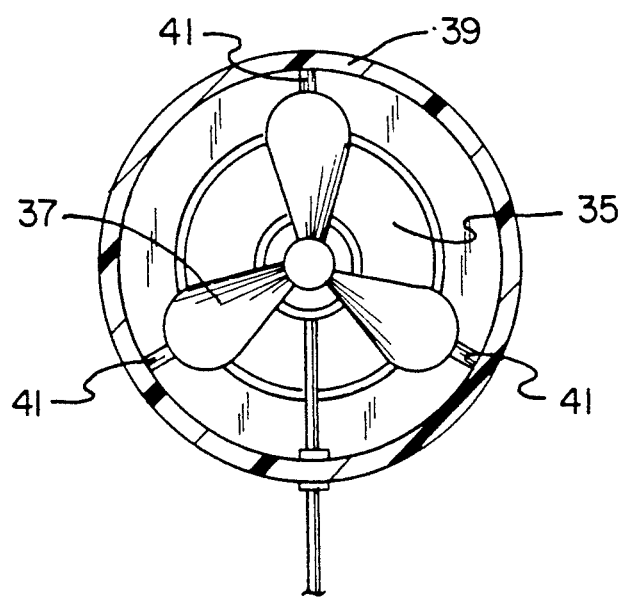
FIG. 6 is an enlarged, cross-sectional view of the embodiment shown in FIG. 5 taken along the line 6—6 thereof.

An electrical fan assembly 33 (and see FIGS. 5 and 6) is connected to the plural-aperture-including air duct 12, for creating a vacuum in the plural-aperture-including air duct 12, for moving air from the room 14 through the apertures 18 and through the air duct 12 to outside the air duct 12 and outside the room 14 through outlet duct 23. The plural-aperture-including air duct 12 includes a plurality of air duct branches 22. The electrical fan assembly 33 includes a motor 35 and a fan blade 37. The fan assembly 33 is supported by brackets 41 inside a housing 39 which is connected to the plural-aperture-including air duct 12 and to the outlet duct 23.

Figure 3:
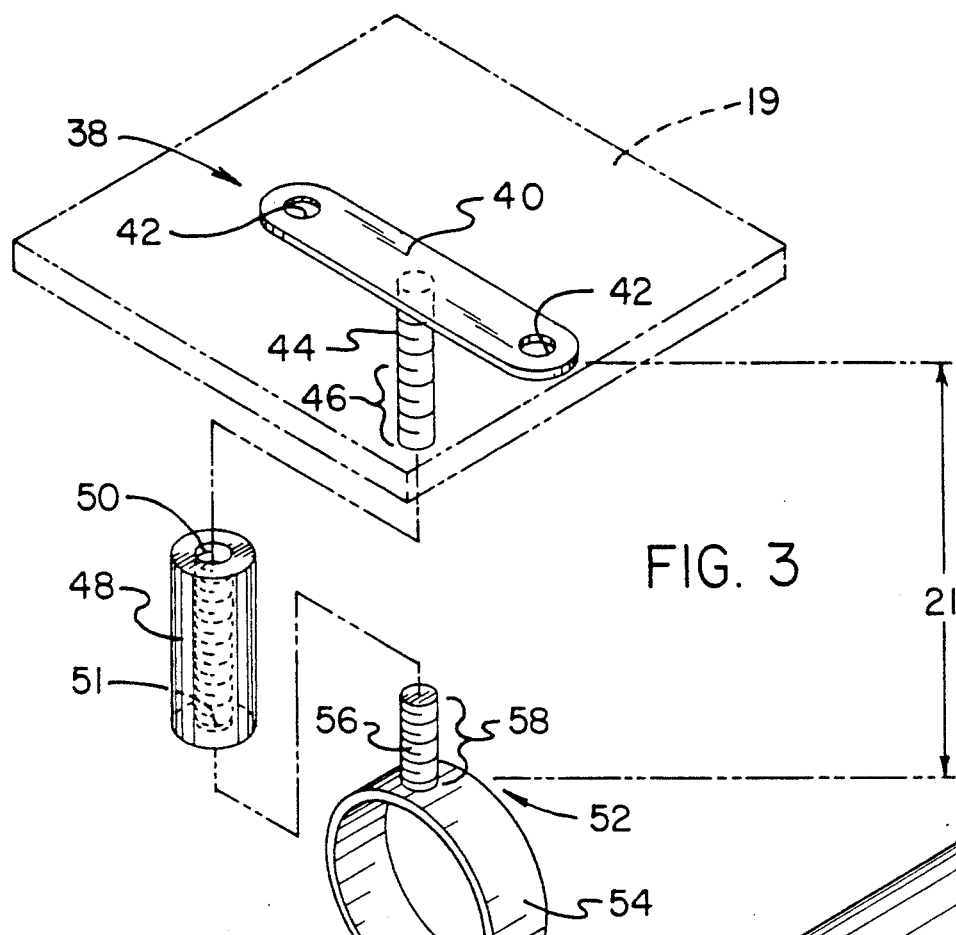
FIG. 3 is an exploded view of an adjustable hanger assembly for hanging plural-aperture-including air ducts of the invention from a ceiling.
Figure 4:
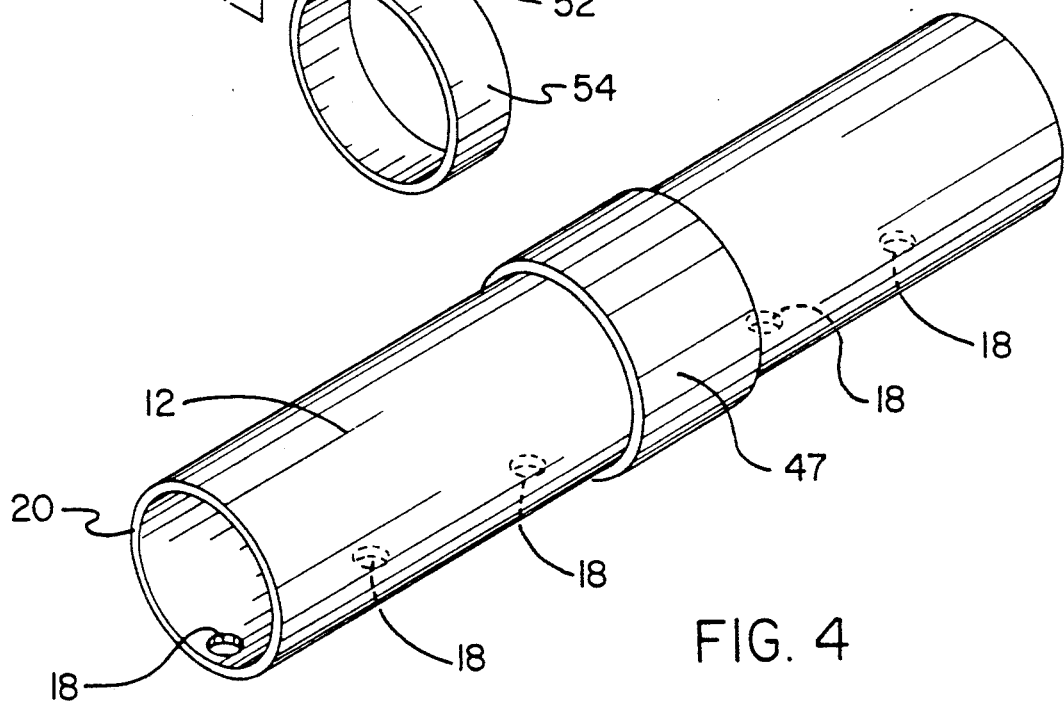
FIG. 4 is a perspective view two plural-aperture-including air ducts of the invention joined together with a joint coupler.

Turning to FIGS. 3-4, an adjustable hanger assembly 36 is shown for connecting the plural-aperture-including air duct 12 to a ceiling 19. Reference numerals are shown that correspond to like reference numerals that designate like elements shown in the other figures. In addition, in FIGS. 3-4, adjustable hanger assembly 36 includes a first element 38 for connecting to the ceiling 19, wherein the ceiling connecting element 38 includes a horizontal plate element 40 which includes a plurality of apertures 42 and a first vertically projecting element 44 which includes first threads 46. A sleeve element 48 includes a first threaded portion 50 and a second threaded portion 51. The first threaded portion 50 is complementary to the first threads 46 on the first vertically projecting element 44. A duct connecting element 52 includes a hollow cylindrical element 54 for encompassing a portion of the plural-aperture-including air duct 12 and includes a second vertically projecting element 56 which includes second threads 58. The second threads 58 on the second vertically projecting element 56 are complementary to the second threaded portion 51 on the sleeve element 48. A coupling element 47 is used to connect one length of air duct 12 to another.

More specifically, the first threads 46 are left-handed, and the second threads 58 are right-handed. Also, more specifically, the sleeve element 48 includes a first threaded portion 50 which is complementary to left-handed first threads 46, and a second threaded portion 51 which is complementary to right-handed second threads 58. By turning the sleeve 48 either clockwise or counterclockwise, the distance 21 between the horizontal plate element 40 and the duct connecting element 52 can be adjusted.

Turning to FIGS. 7-8, a second embodiment of the wide area air removal apparatus of the invention is shown. Reference numerals are shown that correspond to like reference numerals that designate like elements shown in the other figures. In addition, in FIGS. 7-8, a plurality of ash tray collars 24 are placed in a linear array on a bar 49. The ash tray collars 24 are provided for placement circumferentially around ash trays 26. The ash tray collars 24 including apertures 28 for drawing in air adjacent to the ash trays 26. The ash trays 26 are connected, by tubes 53, to a manifold 25 which is connected to a first end 32 of a feeder line 30. A second end 34 of the feeder line 30 is connected to the plural-aperture-including air duct 12. As desired, either the feeder line 30 or the manifold 25 can include additional apertures or not. A cap 55 is provided at one end of the air duct 12.

Although the plural-aperture-including air duct 12 can be made from a variety of materials, an apparatus 10 has been constructed in accordance with the principles of the invention using 90 feet of 4 inch polyvinylchloride (PVC) pipe with ¾ inch holes or apertures spaced approximately 6 inches apart. The holes were drilled in PVC pipe. The PVC pipe is suspended approximately 3 inches from the ceiling. A 6 inch, inline duct blower is used having the capability of removing 270 cubic feet of air per hour. The blower has a 1/20 horsepower motor and operates on 110 VAC current. The apparatus in accordance with the invention can employ relatively low cost off-the-shelf ducts, couplings, and bends without the need for customized components.

The rate of removal of smoke-laden or other odor-bearing air from a room depends upon a number of parameters which may be selected as is deemed suitable for a particular application. The parameters include: the volume of the room; the size of the plural-aperture-including air ducts; the size of the apertures; the spacing of the apertures; the power of the blower, and the strength of the vacuum created in the air duct.

By using a wide area air removal apparatus of the invention, the odor of smoke is substantially eliminated without substantially affecting normal heating and cooling of room air.

It is apparent from the above that the present invention accomplishes all of the objects set forth by providing a new and improved wide area air removal apparatus that is low in cost, relatively simple in design and operation, and which may advantageously be used to efficiently and inexpensively remove smoke-laden and other odor-bearing air from a room.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved wide area air removal apparatus, comprising:
   at least one air duct traversing a portion of the wide area, said air duct having a length and at least one sidewall which includes a plurality of apertures arrayed along the length of said air duct, and
   means, connected to said plural-aperture-including air duct, for creating a vacuum in said plural-aperture-including air duct, for moving air from the wide area through said apertures and through said air duct to outside said air duct,
   further including adjustable hanger assemblies for connecting said plural-aperture-including air duct to a ceiling, and
   wherein said adjustable hanger assemblies include:
   a first element for connecting to the ceiling, wherein said ceiling connecting element includes a horizontal plate element which includes a plurality of apertures and a first vertically projecting element which includes first threads,
   a sleeve element which includes a first threaded portion and a second threaded portion, wherein said first threaded portion is complementary to said first threads on said first vertically projecting element,
   a duct connecting element which includes a hollow cylindrical element for encompassing a portion of said plural-aperture-including air duct and includes a second vertically projecting element which includes second threads, wherein said second threads on said second vertically projecting element are complementary to said second threaded portion on said sleeve element.

2. The apparatus described in claim 1 wherein said plural-aperture-including air duct includes a plurality of air duct branches.

3. The apparatus described in claim 1 wherein said air moving means includes an electric fan assembly.

4. The apparatus described in claim 1 wherein said air moving means moves air from said plural-aperture-including air duct to an area outside the wide area.

5. The apparatus described in claim 1 wherein the wide area is a room in a building, and the area outside the wide area is outside the building.

6. The apparatus described in claim 1, further including an outlet duct, connected to said vacuum creating means, for conveying air from the wide area to outside the wide area.

7. A new and improved wide area air removal apparatus, comprising:
   at least one air duct traversing a portion of the wide area, said air duct having a length and at least one sidewall which includes a plurality of apertures arrayed along the length of said air duct, and
   means, connected to said plural-aperture-including air duct, for creating a vacuum in said plural-aperture-including air duct, for moving air from the wide area through said apertures and through said air duct to outside said air duct, further including:
   ash tray collars for placement circumferentially around ash trays, said ash tray collars defining an annular surface adjacent the outer peripheral edge of each said ash tray, respectively, each said annular surface including cylindrical apertures for drawing in air adjacent to the ash trays, and
   feeder lines, connected at a first end to said ash tray collars, and connected at a second end to said plural-aperture-including air duct.

8. The apparatus described in claim 1 wherein said first threads are left-handed, and said second threads are right-handed.

9. The apparatus described in claim 8 wherein said sleeve element includes:
   a first threaded portion which is complementary to left-handed threads, and
   a second threaded portion which is complementary to right-handed threads.

* * * * *